US012717364B2

(12) United States Patent
Boley et al.

(10) Patent No.: US 12,717,364 B2
(45) **Date of Patent: *Aug. 25, 2026**

(54) ENERGY OPERATING SYSTEMS AND RELATED TECHNIQUES

(71) Applicant: Everactive, Inc., Santa Clara, CA (US)

(72) Inventors: James Boley, San Francisco, CA (US); Christopher J. Lukas, Charlottesville, VA (US); Benton H. Calhoun, Charlottesville, VA (US); Farah B. Yahya, Charlottesville, VA (US)

(73) Assignee: Everactive, Inc., Santa Clara, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/662,206

(22) Filed: May 13, 2024

(65) Prior Publication Data

US 2024/0295889 A1 Sep. 5, 2024

Related U.S. Application Data

(63) Continuation of application No. 17/450,626, filed on Oct. 12, 2021, now Pat. No. 12,007,799.

(51) Int. Cl.
*G05F 1/56* (2006.01)

(52) U.S. Cl.
CPC .................................... *G05F 1/56* (2013.01)

(58) Field of Classification Search
None
See application file for complete search history.

(56) References Cited

U.S. PATENT DOCUMENTS

| | | | | |
|---|---|---|---|---|
| 9,225,199 | B2 | 12/2015 | Teggatz et al. | |
| 9,748,838 | B2 | 8/2017 | Chew et al. | |
| 9,882,428 | B2 | 1/2018 | Calhoun et al. | |
| 9,973,832 | B2 | 5/2018 | Yamada et al. | |
| 10,270,282 | B2 | 4/2019 | Guo et al. | |
| 10,340,700 | B2 | 7/2019 | Frenila et al. | |
| 10,447,053 | B2 | 10/2019 | Tanaka et al. | |
| 10,491,003 | B2 | 11/2019 | Amin et al. | |
| 10,566,844 | B2 * | 2/2020 | Bito | H02J 50/30 |
| 10,582,358 | B1 | 3/2020 | Zalewski et al. | |
| 10,936,035 | B2 | 3/2021 | Stroman et al. | |
| 11,146,104 | B2 * | 10/2021 | La Rosa | H02J 50/20 |
| 11,223,300 | B2 | 1/2022 | Feng et al. | |
| 11,251,692 | B2 | 2/2022 | Pahlevaninezhad et al. | |
| 11,277,018 | B2 | 3/2022 | De Vos et al. | |

(Continued)

FOREIGN PATENT DOCUMENTS

WO WO-2020047663 A1 3/2020

OTHER PUBLICATIONS

Amin S.S., et al., "MISIMO: A Multi-Input Single-Inductor Multi-Output Energy Harvesting Platform in 28-nm FDSOI for Powering Net-Zero-Energy Systems," IEEE Journal of Solid-State Circuits, Dec. 2018, vol. 53 (12), 13 pages.

(Continued)

*Primary Examiner* — Thomas J. Hiltunen
(74) *Attorney, Agent, or Firm* — Weaver Austin Villeneuve & Sampson LLP

(57) ABSTRACT

Circuits and techniques are described that relate to an "energy operating system" for tracking available energy and energy consumption in a system or device to support a wide range of power management and related functionalities.

20 Claims, 6 Drawing Sheets

(56) References Cited

U.S. PATENT DOCUMENTS

| | | | | |
|---|---|---|---|---|
| 11,374,502 | B2 | 6/2022 | Feng et al. | |
| 11,750,026 | B2 | 9/2023 | Smith et al. | |
| 11,855,556 | B2 * | 12/2023 | Huh | H02J 50/15 |
| 12,007,799 | B2 * | 6/2024 | Boley | H02N 99/00 |
| 2005/0264271 | A1 | 12/2005 | Lam et al. | |
| 2011/0006742 | A1 | 1/2011 | Teggatz et al. | |
| 2011/0043181 | A1 | 2/2011 | Jing et al. | |
| 2012/0032518 | A1 | 2/2012 | Huang et al. | |
| 2012/0068669 | A1 | 3/2012 | Trainor et al. | |
| 2014/0246908 | A1 | 9/2014 | Chew et al. | |
| 2015/0035378 | A1 | 2/2015 | Calhoun et al. | |
| 2017/0187187 | A1 | 6/2017 | Amin et al. | |
| 2018/0034279 | A1 | 2/2018 | Frenila et al. | |
| 2018/0145518 | A1 | 5/2018 | Onizuka et al. | |
| 2019/0020290 | A1 * | 1/2019 | Feng | H02J 50/20 |
| 2019/0329653 | A1 * | 10/2019 | Ueta | H02J 50/10 |
| 2020/0287479 | A1 | 9/2020 | Wei et al. | |
| 2020/0374604 | A1 | 11/2020 | Park et al. | |
| 2021/0116322 | A1 | 4/2021 | Klanderud et al. | |
| 2021/0123835 | A1 | 4/2021 | Glennon et al. | |
| 2021/0251548 | A1 * | 8/2021 | Bose | A61B 5/7225 |
| 2021/0389214 | A1 | 12/2021 | Glennon et al. | |
| 2022/0173602 | A1 | 6/2022 | Shim | |
| 2022/0239150 | A1 | 7/2022 | De Vos et al. | |
| 2023/0029579 | A1 | 2/2023 | Lee et al. | |
| 2023/0113677 | A1 | 4/2023 | Boley et al. | |

OTHER PUBLICATIONS

International Preliminary Report on Patentability and Written Opinion dated Apr. 25, 2024 in PCT Application No. PCT/US2022/077728.

International Search Report and Written Opinion dated Jan. 12, 2023 in PCT Application No. PCT/US2022/077728.

U.S. Final Office Action dated Oct. 24, 2023 in U.S. Appl. No. 17/450,626.

U.S. Non-Final Office Action dated Apr. 12, 2023 in U.S. Appl. No. 17/450,626.

U.S. Notice of Allowance dated Feb. 13, 2024 in U.S. Appl. No. 17/450,626.

EP Extended European Search report dated Nov. 26, 2025 in EP Application No. 22881917.3.

* cited by examiner

ENERGY OPERATING SYSTEMS AND RELATED TECHNIQUES

BACKGROUND

Electronic devices that rely on battery power and/or energy harvesting employ a wide variety of circuit designs and power management techniques to reduce power consumption. Power management techniques monitor available energy and adjust operational modes of a device accordingly. Conventionally, such techniques measure battery voltage or the voltage on a local energy storage capacitor as a proxy for energy. However, while such an approach may provide a relatively accurate estimate of the energy stored on the device, it does not provide information about how energy is being generated or consumed.

SUMMARY

According to a first class of implementations, a device includes one or more components, one or more energy inputs configured to receive harvested energy from one or more energy sources, and a plurality of energy rails configured to provide regulated energy to the one or more components. Regulator circuitry is configured to generate the regulated energy from the harvested energy. Switching circuitry is configured to selectively connect the one or more energy inputs and the plurality of energy rails via the regulator circuitry. Logic is configured to track amounts of the harvested energy and amounts of the regulated energy transferred via the regulator circuitry, and to control operation of the device based on the amounts of the harvested energy and the amounts of the regulated energy.

According to a specific implementation of the first class of implementations, the device includes an energy storage device, and the switching circuitry is configured to selectively connect the energy storage device to the one or more energy inputs and the plurality of energy rails. According to a more specific implementation, the energy storage device is one of a plurality of energy storage devices having different energy storage capacities.

According to another specific implementation of the first class of implementations, the one or more energy inputs include a plurality of energy inputs, and the regulator circuitry employs a single inductor.

According to another specific implementation of the first class of implementations, the one or more components include a transmitter configured to transmit energy data derived from the amounts of the harvested energy and the amounts of the regulated energy. According to a more specific implementation, the one or more components include a receiver configured to receive remotely-generated control data that is responsive to the energy data, the control data being configured to control operation of the device.

According to another specific implementation of the first class of implementations, the logic is configured to track the amounts of the harvested energy and the amounts of the regulated energy by counting energy transfer events. Each energy transfer event represents an energy transfer between a particular one of the energy inputs and a particular one of the energy rails via the regulator circuitry. According to a more specific implementation, each energy transfer corresponds to substantially the same amount of charge.

According to another specific implementation of the first class of implementations, the logic is further configured to compare the harvested energy to the regulated energy.

According to another specific implementation of the first class of implementations, the logic is further configured to determine one or both of a rate of change of the harvested energy and a rate of change of the regulated energy.

According to another specific implementation of the first class of implementations, the logic is configured to track one or both of the amounts of the harvested energy and the amounts of the regulated energy over multiple time periods.

According to another specific implementation of the first class of implementations, the logic is configured to control operation of the device by controlling operation of the switching circuitry.

According to another specific implementation of the first class of implementations, the logic is configured to control operation of the device by selecting an operational mode of the device.

According to another specific implementation of the first class of implementations, the logic is configured to control the switching circuitry to connect the regulator circuitry to a first energy rail of the plurality of energy rails based on an energy request corresponding to the first energy rail.

According to another specific implementation of the first class of implementations, the one or more energy inputs include a plurality of energy inputs, and the logic is configured to control the switching circuitry to connect the regulator circuitry to a first energy input of the plurality of energy inputs based on a priority scheme representing the plurality of energy inputs. According to a more specific implementation, the logic is also configured to control the switching circuitry to connect the regulator circuitry to the first energy input based on a maximum power point of an energy harvester connected to the first energy input.

According to another specific implementation of the first class of implementations, the logic is configured to track one or both of the amounts of the harvested energy and the amounts of the regulated energy in connection with an operation performed by the device.

According to another specific implementation of the first class of implementations, the logic is configured to control battery-less operation of the device based on the amounts of the harvested energy and the amounts of the regulated energy.

According to a second class of implementations, amounts of harvested energy received by regulator circuitry of a wireless sensor node from one or more energy sources are tracked. Amounts of regulated energy provided by the regulator circuitry of the wireless sensor node to a plurality of energy rails of the wireless sensor node are tracked. Operation of the wireless sensor node is controlled based on the amounts of the harvested energy and the amounts of the regulated energy.

According to a specific implementation of the second class of implementations, energy data representing one or both of the amounts of the harvested energy and the amounts of the regulated energy are transmitted to a remote device.

According to another specific implementation of the second class of implementations, energy data representing one or both of the amounts of the harvested energy and the amounts of the regulated energy are received.

According to another specific implementation of the second class of implementations, the wireless sensor node is one of a plurality of wireless sensor nodes operating in an environment. Operation of one or more of the other wireless sensor nodes is controlled based on one or both of the amounts of the harvested energy and the amounts of the regulated energy.

According to another specific implementation of the second class of implementations, the wireless sensor node is one of a plurality of wireless sensor nodes operating in an environment. One or more network characteristics relating to one or more of the wireless sensor nodes are controlled based on one or both of the amounts of the harvested energy and the amounts of the regulated energy.

According to another specific implementation of the second class of implementations, the wireless sensor node is one of a plurality of wireless sensor nodes operating in an environment. A model of the environment is generated based on one or both of the amounts of the harvested energy and the amounts of the regulated energy.

According to another specific implementation of the second class of implementations, the amounts of the harvested energy and the amounts of the regulated energy represent energy transfer events. Each energy transfer event representing an energy transfer between a particular one of the energy sources and a particular one of the energy rails via the regulator circuitry.

According to another specific implementation of the second class of implementations, the harvested energy is compared to the regulated energy.

According to another specific implementation of the second class of implementations, one or both of a rate of change of the harvested energy and a rate of change of the regulated energy is determined.

According to another specific implementation of the second class of implementations, one or both of the amounts of the harvested energy and the amounts of the regulated energy is tracked over multiple time periods.

According to another specific implementation of the second class of implementations, controlling operation of the wireless sensor node includes controlling operation of switching circuitry configured to selectively connect the one or more energy sources and the plurality of energy rails via the regulator circuitry.

According to another specific implementation of the second class of implementations, controlling operation of the wireless sensor node includes selecting an operational mode of the wireless sensor node.

According to another specific implementation of the second class of implementations, tracking of one or both of the amounts of the harvested energy and the amounts of the regulated energy is done in connection with an operation performed by the wireless sensor node.

According to another specific implementation of the second class of implementations, operation of the wireless sensor node is battery-less operation.

According to a third class of implementations, a system includes logic configured to track amounts of first energy received by regulator circuitry of a device from one or more energy sources. The logic is also configured to track amounts of second energy provided by the regulator circuitry of the device to a plurality of energy rails of the device. The logic is also configured to control operation of the device based on the amounts of the first energy and the amounts of the second energy.

According to a specific implementation of the third class of implementations, the device is one of a plurality of devices operating in an environment, and the logic is further configured to control operation of one or more of the other devices based on one or both of the amounts of the first energy and the amounts of the second energy.

According to another specific implementation of the third class of implementations, the device is one of a plurality of devices operating in an environment, and the logic is further configured to control one or more network characteristics relating to one or more of the devices based on one or both of the amounts of the first energy and the amounts of the second energy.

According to another specific implementation of the third class of implementations, the device is one of a plurality of devices operating in an environment, and the logic is further configured to generate a model of the environment based on one or both of the amounts of the first energy and the amounts of the second energy.

According to another specific implementation of the third class of implementations, the logic is further configured to predict energy availability based on one or both of the amounts of the first energy and the amounts of the second energy.

According to another specific implementation of the third class of implementations, the amounts of the first energy and the amounts of the second energy represent energy transfer events. Each energy transfer event represents an energy transfer between a particular one of the energy sources and a particular one of the energy rails via the regulator circuitry.

According to another specific implementation of the third class of implementations, the logic is further configured to compare the first energy to the second energy.

According to another specific implementation of the third class of implementations, the logic is further configured to determine one or both of a rate of change of the first energy and a rate of change of the second energy.

According to another specific implementation of the third class of implementations, the logic is further configured to track one or both of the amounts of the first energy and the amounts of the second energy over multiple time periods.

According to another specific implementation of the third class of implementations, the logic is configured to control operation of the device by controlling operation of switching circuitry configured to selectively connect the one or more energy sources and the plurality of energy rails via the regulator circuitry.

According to another specific implementation of the third class of implementations, the logic is configured to control operation of the device by selecting an operational mode of the device.

According to another specific implementation of the third class of implementations, the logic is configured to track one or both of the amounts of the first energy and the amounts of the second energy in connection with an operation performed by the device.

According to another specific implementation of the third class of implementations, operation of the device is battery-less operation.

According to a fourth class of implementations, a circuit includes a plurality of energy inputs configured to receive input energy from a plurality of energy sources, a plurality of energy rails configured to provide regulated energy, and an energy store. Regulator circuitry is configured to generate the regulated energy from the input energy. Switching circuitry is configured to selectively connect the energy inputs and the energy rails via the regulator circuitry. The switching circuitry includes a first switch configured to provide a first portion of the input energy to the energy store and a second switch configured to provide a second portion of the input energy to a highest energy rail of the energy rails. Logic is configured to sense a first signal level associated with the energy store and a second signal level associated with highest energy rail. The logic is further configured to control operation of the first and second switches based on which of the first and second signal levels is higher. Cold-start circuitry is configured to start operation of the circuit when the energy store is substantially empty.

According to a specific implementation of the fourth class of implementations, the logic is configured to control operation of the first and second switches by driving body diodes of the first and second switches using the higher of the first and second signal levels.

According to another specific implementation of the fourth class of implementations, the logic is configured to control operation of the first and second switches by driving gates of the first and second switches using the higher of the first and second signal levels.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes circuits and techniques for tracking available energy and energy consumption in a system or device to support a wide range of power management and related functionalities. Implementations of such circuits and techniques are referred to herein using the term "energy operating system" or "EOS" based on an analogy with conventional software operating systems which perform actions, e.g., allocation of resources and scheduling of tasks, based an awareness of the state of a computing system.

Specific implementations will be described in the context of monitoring systems that include wireless sensor nodes deployed, for example, in an industrial facility. However, it should be noted that a much broader range of implementations is enabled by the present disclosure. For example, a wide range of electronic systems and devices may be implemented according to the techniques described herein that may or may not relate to monitoring or sensing applications. In another example, both individual devices and systems of devices can be implemented with EOSs enabled by the present disclosure.

An EOS may be implemented on one or multiple levels of a system. For example, an individual device (e.g., a sensor node) may be implemented with an EOS in which the tracking of energy and related functionality are onboard the device. Alternatively, an EOS may have additional layers or levels in a system of devices. For example, higher-level and/or more sophisticated functionality and decision making in a system can be supported based on energy tracked in individual devices or subsystems.

In addition, EOS functionality or logic may be implemented in a variety of ways (e.g., hardware, firmware, software, or combinations of these), the nature of which may be dependent on the system level in which the functionality or logic resides. For example, power management functionality might be implemented on a sensor node in hardware or firmware, while system-level functionality or management of resources might be implemented in software, e.g., in a wireless base station or a remote, cloud-based platform. An example of a system in which an EOS may be implemented will be instructive.

Figure 1:
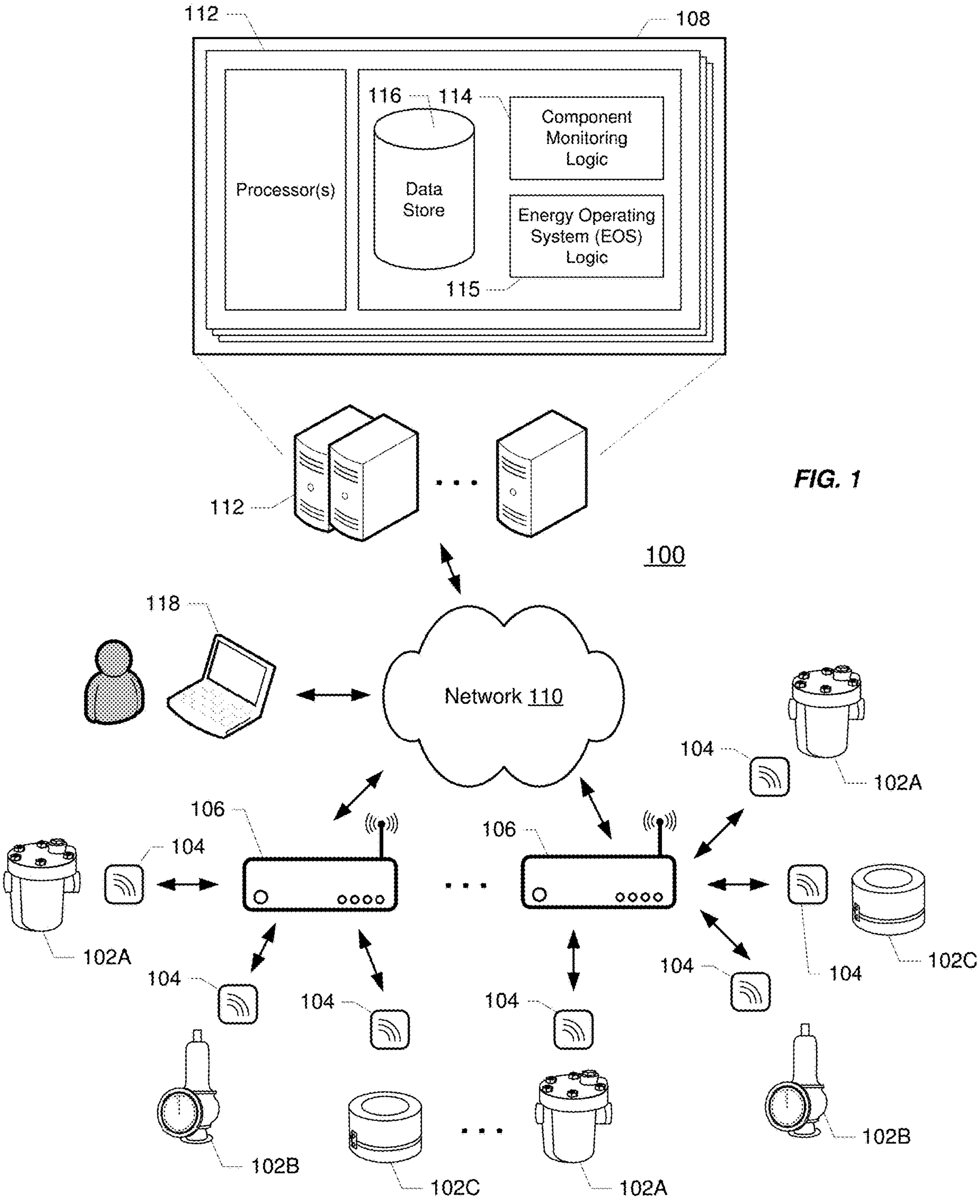
FIG. 1 depicts an example of a cloud-connected monitoring system enabled by the present disclosure.

FIG. 1 depicts a monitoring system 100 in which various types of pressurized system components, e.g., steam traps 102A, safety valves 102B, and rupture discs 102C, (potentially hundreds or even thousands of such components) are deployed throughout a facility that employs a steam system. The details of the steam system are not shown for reasons of clarity. And it should again be noted that the sensor nodes and the system of FIG. 1 are merely examples of devices and a system that may be implemented using the techniques described herein.

Each component 102 has an associated sensor node 104 mounted on or near the component. Sensor nodes 104 generate one or more types of sensor data relating to the associated component 102 and/or its adjacent piping. Sensor nodes 104 also generate energy tracking data as described herein. Sensor nodes 104 transmit the sensor data to control nodes 106 that, in turn, transmit the sensor data to a monitor service 108 via network 110. In some implementations in which higher-level EOS functionality is supported, sensor nodes 104 may also transmit the energy tracking data to control nodes 106 and/or monitor service 108.

Monitor service 108 may conform to any of a wide variety of architectures such as, for example, a services platform deployed at one or more co-locations, each implemented with one or more servers 112. Monitor service 108 may also be partially or entirely implemented using cloud-based computing resources. Network 110 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on.

At least some of the examples described herein contemplate implementations based on computing models that enable ubiquitous, convenient, on-demand network access to a pool of computing resources (e.g., cloud-based networks, servers, storage, applications, and services). As will be understood, such computing resources may be integrated with and/or under the control of the same entity controlling monitor service 108. Alternatively, such resources may be independent of service 108, e.g., on a platform under control of a separate provider of computing resources with which service 108 connects to consume computing resources as needed, e.g., a cloud-computing platform or service.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Sensor nodes 104 may communicate with control nodes 106 using any of a wide variety of wired and wireless protocols and technologies. According to some implementations, control nodes 106 and sensor nodes 104 communicate using a proprietary low-power communication protocol known as Evernet™ provided by Everactive™, Inc., of Santa Clara, California. Examples of such protocols and associated circuitry suitable for use with such implementations are described in U.S. Pat. Nos. 9,020,456, 9,413,403, 10,667,214, and 10,420,072, the entire disclosure of each of which is incorporated herein by reference for all purposes. However, it should be noted that implementations are contemplated in which other modes of communication between the sensor nodes and the rest of the system are employed.

Control nodes 106 may be implemented using any of a variety of suitable industrial Internet gateways, and may connect to monitor service 108 using any of a variety of wired and wireless protocols, e.g., various versions of Ethernet, various cellular (e.g., 3G, LTE, 5G, etc.), various wi-fi (802.11b/g/n, etc.), etc. In some cases, otherwise conventional gateways are augmented to include components that implement the Evernet™ protocol.

Each sensor node 104 generates sensor data representing one or more temperatures associated with the component with which it is associated, and possibly other sensed data associated with the component such as ultrasonic, acoustic, or vibration measurements. Temperature measurements may be captured using one or more temperature sensors (e.g., thermistors, thermocouples, resistance temperature detectors (RTDs), etc.) thermally connected to the piping at the inlet side of the component (e.g., the steam side of a steam trap) and/or the outlet side of the component (e.g., the condensate side of a stream trap). The sensor nodes may also be configured to capture and generate sensor data representing ambient temperature and/or humidity of the environment in which the sensor node is deployed.

Each sensor node 104 may also be configured to generate sensor data representing a variety of other parameters generated by a variety of sensor types and/or sources. For example, a sensor node might include sensors configured to measure and/or track light levels, humidity, vibrational or other types of mechanical energy, acoustic energy, ultrasonic energy, etc. Each sensor node 104 may also generate energy tracking data that represents energy provided by each energy source associated with the sensor node and energy consumed via each of multiple energy rails associated with the sensor node.

According to a particular implementation, in response to a wakeup message from its control node 106 or a local wakeup timer, each sensor node 104 transitions from a low-power mode, takes readings on each of its sensors, and transmits digitized versions of the readings to its control node 106 in a packet in which each sensor and its reading are paired (e.g., as a label-value pair). The packet also includes information (e.g., in a header) that identifies the specific sensor node with a unique identifier and the timestamp of the readings in the packet. Information relating to the tracked energy of sensor node 104 may also be transmitted in this manner. The wakeup messages may be periodically transmitted from each control node to its associated sensor nodes. In this way, each sensor node 104 "continuously" monitors the component with which it is associated.

Each control node 106 stores the packets received from its sensor nodes 104 in local memory, and periodically or opportunistically uploads the stored information to monitor service 108 (e.g., to a cloud-based service when the control node is connected to the Internet). Thus, if there is an outage, the control node is able to cache the sensor data until the connection is restored. At least some of the processing of the sensor and/or energy tracking data may be done by monitor service 108, e.g., using logic 114 and 115. However, it should be noted that implementations are contemplated in which at least some of the processing of the sensor and/or energy tracking data generated by sensor nodes 104 may be performed elsewhere, e.g., by sensor nodes 104 and/or by control nodes 106. Monitor service 108 may also store historical data for monitoring system 100 (e.g., in data store 116). The sensor node data and other system data generated and/or received by monitor service 108 and stored in data store 116 may be accessed on demand (e.g., in a dashboard on computing device 118) by responsible personnel associated with the facility or facilities in which the monitoring system is deployed.

Figure 2:
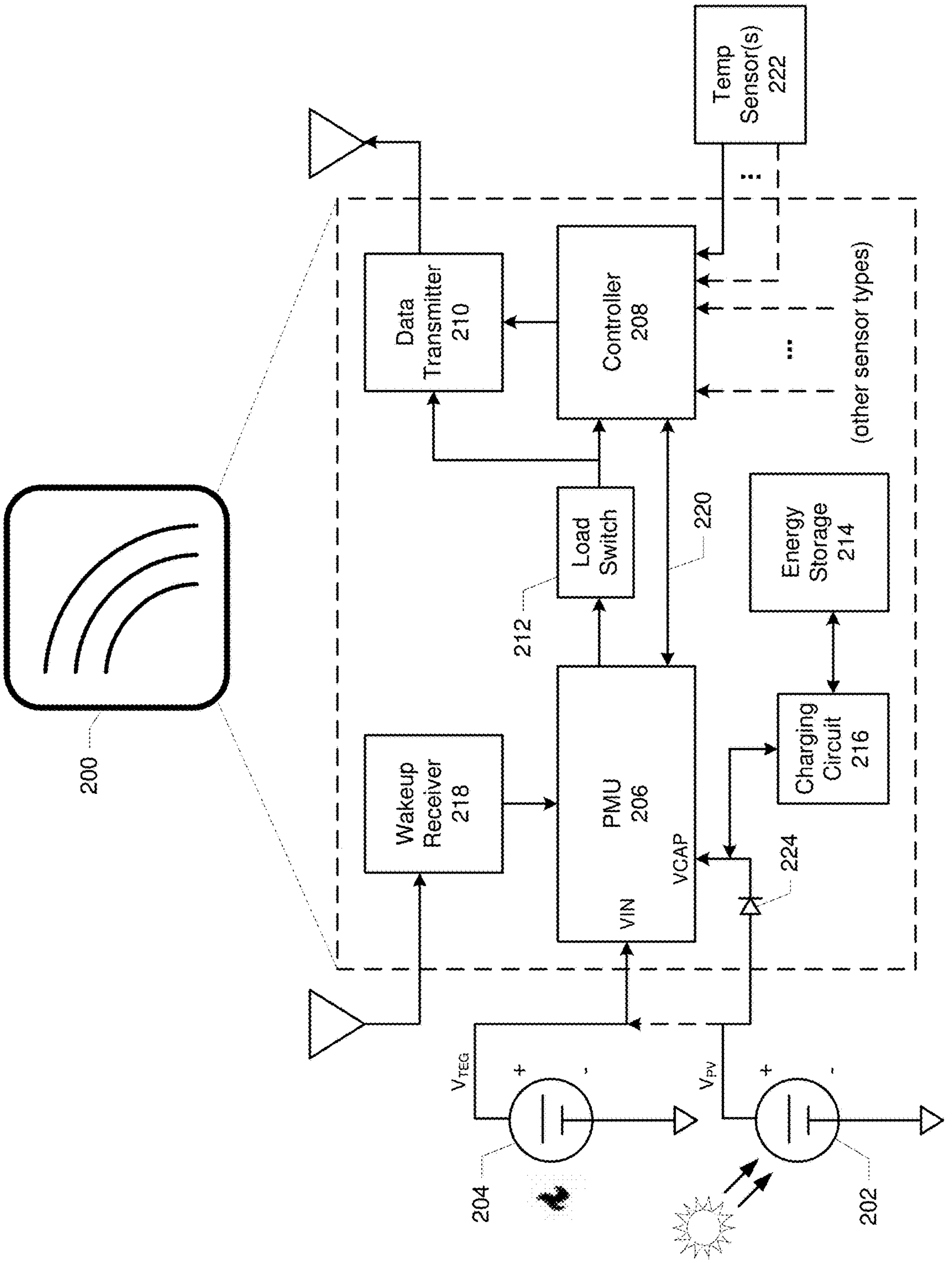
FIG. 2 is a block diagram of a sensor node enabled by the present disclosure.

According to some implementations, sensor nodes for components in a system are employed that operate using power harvested from the environments in which they are deployed. FIG. 2 is a block diagram of an example of such a sensor node 200. In the depicted implementation, sensor node 200 is powered using energy harvested from its environment with a thermoelectric generator (TEG) 204 that captures thermal energy (e.g., from the pipes of a pressurized system) and a photovoltaic (PV) device 202 that captures energy from the ambient light in the vicinity of sensor node 200. Implementations are contemplated in which the sensor node's power management unit may be configured such that the sensor node can use power from the PV device in a "solar only" mode (as indicated by the dashed line from PV device 202 to VIN), the TEG in a "TEG only" mode, or a combination of both in a "solar assist" mode (as indicated by the solid line from PV device 202 to VCAP). Suitable switching circuitry for configuring these connections will be known to those of skill in the art and so is not depicted for clarity.

Sensor node 200 includes a power management unit (PMU) 206 that controls the delivery of energy to various components (e.g., controller 208 and data transmitter 210) via load switch 212. VIN is the harvesting input to PMU 206, and VCAP, and multiple energy rails (not shown for clarity) are the generated outputs. PMU 206 charges energy storage device 214 (e.g., a super-capacitor) with VCAP via charging circuit 216 using energy harvested from either or both of PV device 202 and TEG 204 (depending on the harvesting mode). Load switch 212 and charging circuit 216 control when power is provided to the rest of sensor node 200 and allow sensor node 200 to be functional while energy storage device 214 is charging.

Sensor node 200 receives a wakeup message (e.g., with wakeup receiver 218) from, for example, a system control node with which it is associated. Receipt of the wakeup message triggers control of load switch 212 by PMU 206 to provide power to controller 208 for capturing readings associated with the system component being monitored by sensor node 200, and to transmitter 210 for transmitting sensor data and/or energy tracking data to the control node. PMU 206 also communicates with controller 208 via digital I/O channel 220. This can be used by the controller to monitor the status of the PMU 206, and to update its configuration or calibration settings. Channel 220 can also be used by controller 208 to capture energy tracking data as described herein.

Once awakened and powered up, controller 208 captures readings using one or more sets of sensors associated with sensor node 200. As depicted, these might include one or more temperature sensors 222 (e.g., a thermistor, thermocouple, or RTD connected to the piping adjacent the inlet side or the outlet side of the component). Sensors to detect or measure other parameters or types of readings (e.g., ambient temperature and/or light, acoustic, ultrasonic, humidity, vibrational/mechanical energy, etc.) are also contemplated. As discussed above, controller 208 packetizes the digitized sensor data and/or energy tracking data and transmits the packet(s) to the associated sensor node via data transmitter 210.

Figure 3:
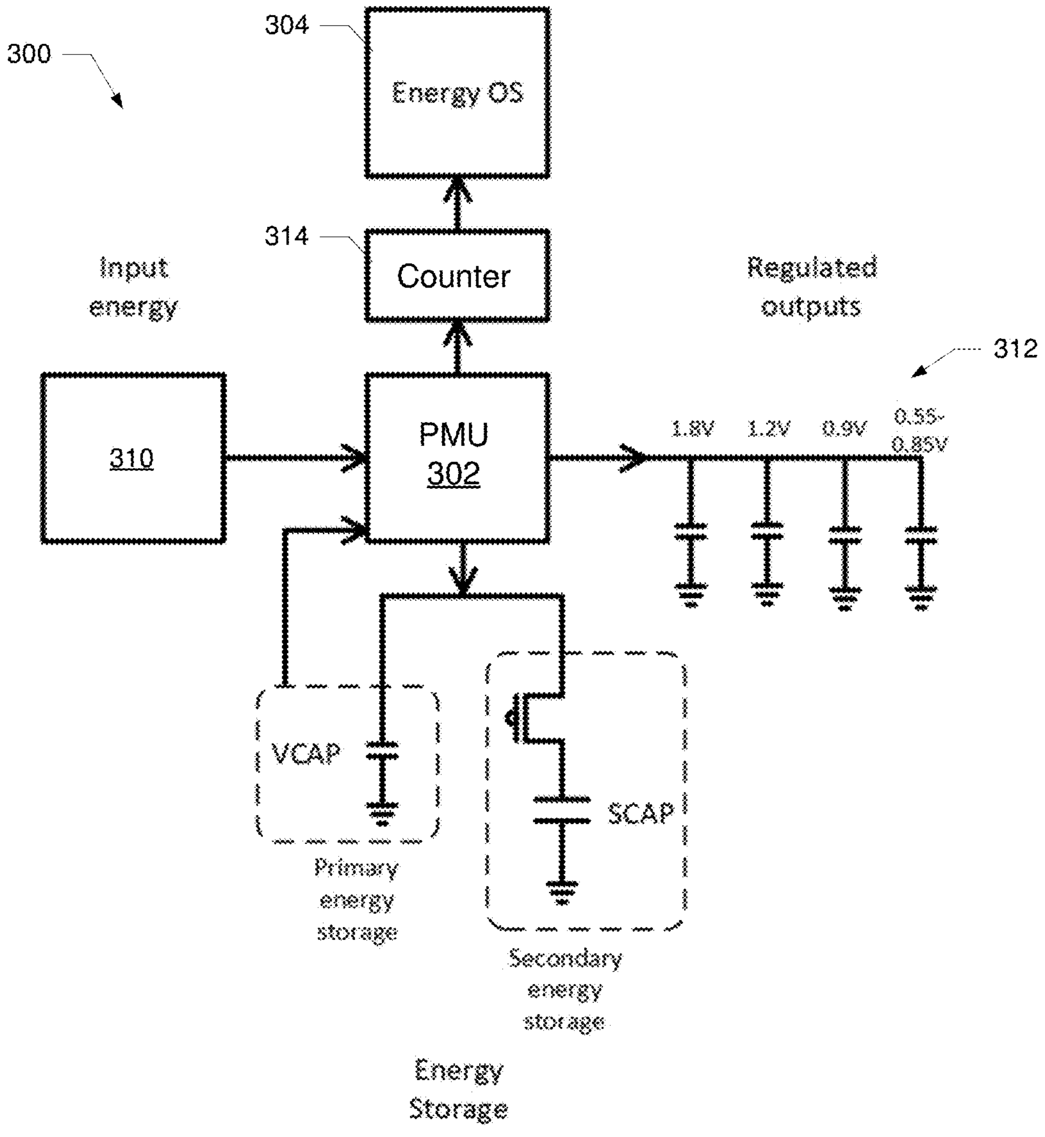
FIG. 3 is a simplified diagram of a power management unit (PMU) of a device interacting with an energy operating system (EOS) enabled by the present disclosure.

FIG. 3 is a simplified diagram of a device 300 that includes a power management unit (PMU) 302 (e.g., PMU 206 of sensor node 200) interacting with an energy operating system (EOS) 304 enabled by the present disclosure. PMU 302 includes regulator circuitry and switching circuitry, specific implementations of which will be described with reference to FIG. 4. The regulator circuitry may be implemented using any of a wide variety of regulator topologies that are suitable for converting energy from one or more energy sources 310 to energy suitable for use by device or system components associated with PMU 302. The switching circuitry may be any type of circuitry that is capable of selectively connecting any of multiple energy sources 310 to any of multiple energy rails 312 via the regulator circuitry.

EOS 304 tracks available energy and energy consumed by components of the device of which PMU 302 is a part, and may represent resources and functionality at one or more device and/or system levels. For example, EOS 304 may represent hardware or firmware on the same device as PMU 302 (e.g., implemented using controller 208 of sensor node 200 of FIG. 2), software operating on a control node in communication with device 300 (e.g., control node 106 of FIG. 1), software operating on a remote cloud-based platform (e.g., monitor service 108 of FIG. 1), and/or various combinations thereof. The information tracked by PMU 304 represents the flow of energy from each of energy sources 310 to each of energy rails 312. By knowing something about the incoming energy from one or more sources (e.g., harvesters, battery, storage cap(s), etc.), and knowing something about the outgoing energy across multiple energy rails, a potentially rich set of functionality may be supported including, for example, the way in which the flow of energy is controlled from one or more inputs to multiple outputs of device 300. According to implementations in which multiple components are connected to one rail, the flow of energy to specific components may be tracked by, for example, looking at power switch control bits or other system states indicative of active device components.

According to a particular class of implementations, energy is tracked by counting charge transfer events in which charge is transferred from one of energy sources 310 to one of energy rails 312 via PMU 302 (e.g., charge transfer counter 314). A count is maintained for each energy source and each energy rail thus enabling tracking of the energy provided by each source and the energy consumed via each rail.

According to some implementations, the switching circuitry of PMU 302 allows for the transfer of energy from any one of energy sources 310 to any one of energy rails 312 via the regulator circuitry. Thus, the state of the switching circuitry may be correlated with the current pulses transferred via the regulator circuitry so that the counts for the corresponding source and rail can be incremented.

According to a particular implementation, the switching circuitry of PMU 302 is controlled in response to requests for energy from the energy rails. Such a request might be generated if, for example, the voltage for a particular energy rail drops below a threshold. Where multiple requests are made, a priority scheme may be employed to service the requests, giving priority, for example, to the most frequently used and/or power-hungry rail(s). The logic controlling the switching circuitry of the PMU may be implemented as an asynchronous state machine (e.g., in controller 208 of FIG. 2) that waits for requests, and pairs each request with an energy source.

With its switching circuitry, PMU 302 connects the requesting rail to one of the energy sources. The energy source may be selected based on its readiness (e.g., as signaled by the source) and/or a priority scheme. For example, if multiple energy sources indicate that they are ready, the PMU may choose based on the priority scheme. If none of the other energy sources is ready, e.g., if the requests are coming in at a rate higher than the harvesting sources can tolerate, the PMU may connect the requesting rail to a local storage capacitor (VCAP) which may be configured as both a source of energy for the energy rails and a store of energy received from the energy sources.

According to some implementations, the readiness of a harvesting energy source is determined with reference to its maximum power point (MPP). Depending on the energy available from a given source, the time between current pulses being drawn from that source may vary. As such, the system naturally settles to pulling energy from the source that has the most energy available.

Figure 4:
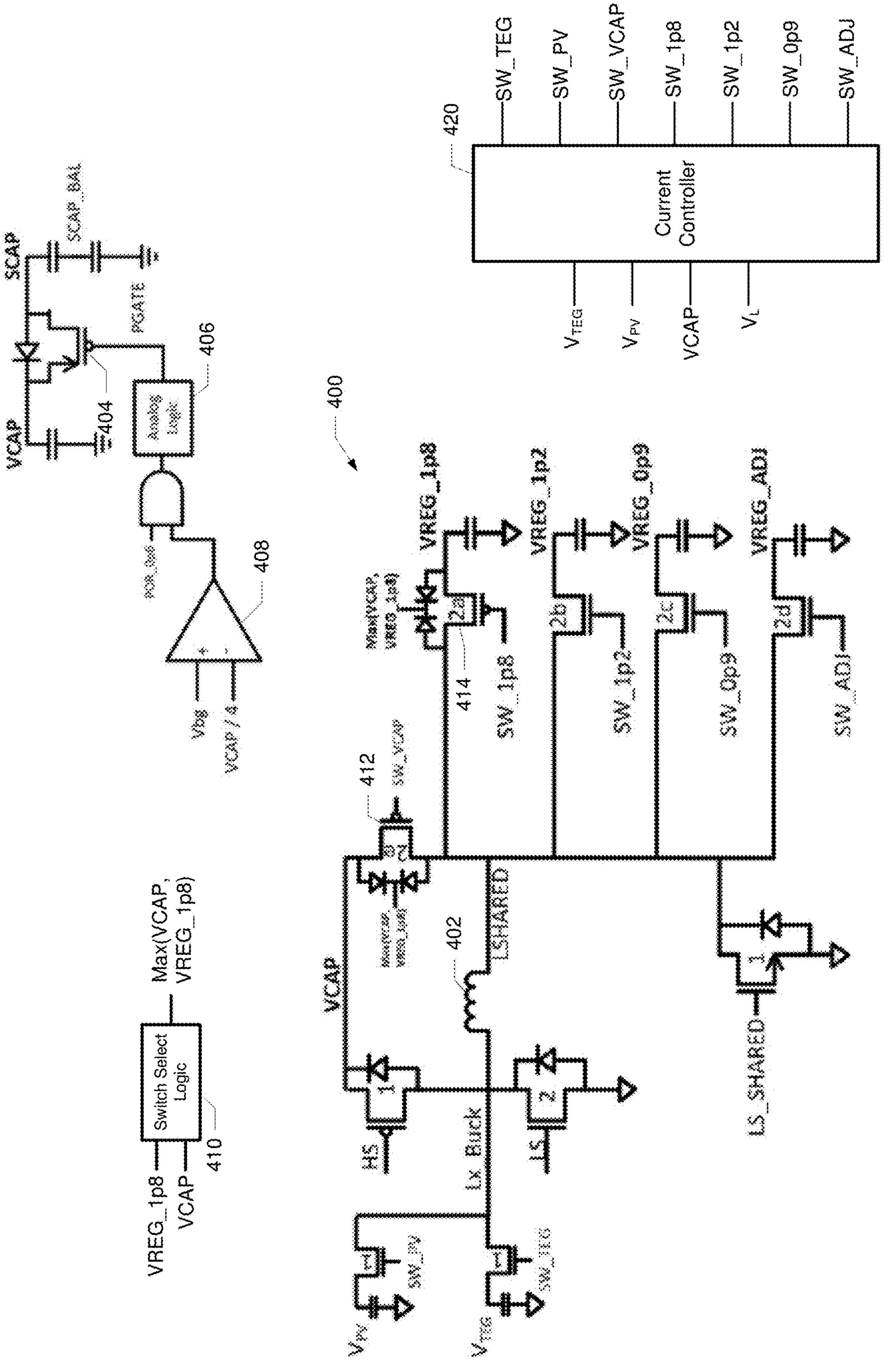
FIG. 4 is a schematic diagram of a power management unit (PMU) for use with some implementations enabled by the present disclosure.

According to a particular implementation, maximum power point tracking (MPPT) for each energy input channel employs a sample-and-hold technique by which the input to the PMU from each harvesting device (e.g., $V_{TEG}$ or $V_{PV}$ as shown in FIG. 2 or 4) is regulated to a fraction of its open circuit voltage (Voc) that corresponds to the harvesting device's MPP (VMPPT). For example, to harvest the maximum amount of energy from a particular PV cell employed with some implementations, $V_{PV}$ is regulated to about ¾ *Voc.

To achieve this, the open circuit voltage for the harvesting device is periodically sampled (e.g., every ~4.5 seconds for ~160 ms) and stored, e.g., on a capacitor. During the sampling period, the harvesting input is not enabled to allow the harvesting source to ramp up to its open circuit voltage. Once this voltage has been stored, the input switch is enabled and the input voltage VIN (e.g., $V_{TEG}$ or $V_{PV}$) is compared to VMPPT. As long as VIN>VMPPT then energy may be provided (e.g., to a requesting rail) from that harvesting input. Providing energy from VIN may then cause it to drop below VMPPT. When energy is not being provided, VIN recovers until it again exceeds VMPPT, and another charging cycle begins. Using this logic, the input voltage of each harvesting device may be regulated to its maximum power point.

According to some implementations, one of which is described with reference to FIG. 4, the architecture of the PMU may be such that each current pulse from a source to a rail represents substantially the same amount of energy. Thus, by counting the charge transfer events for each source and rail, an accurate representation of the energy provided or consumed by each may be generated. It should be understood, however, that an EOS enabled by the present disclosure may be achieved with a different PMU architecture, as well as without a PMU at all. More generally, any device or system in which energy transfers among one or more energy sources and multiple energy rails may be tracked may be implemented with an EOS as described herein.

Depending on the implementation, the charge transfer events may occur at various intervals and have various durations. For implementations in which a substantially uniform amount of charge is transferred for each event, the counts effectively amount to a coulomb counter for each source and rail. Also depending on the implementation, the size of the counter (e.g., number of bits) used may vary considerably depending, for example, on the frequency with which the events are expected to occur, and the relevant period of time over which it is useful to maintain a count.

The time period over which a count is maintained is configurable and may vary considerably (e.g., 100s of milliseconds, seconds, minutes, hours, days, etc.) depending on any of a number of factors including, for example, the frequency and duration of the events being counted, the size of the counters, the energy generation/consumption profile of the source/rail, and/or the functionality being supported and/or the relevant decision(s) to be made.

An EOS may also aggregate and/or maintain historical data relating to the counts, using such information, for example, to track trends for particular energy sources and/or energy rails and support functionality based on that. For example, a histogram may be generated using the counts for a particular sources or rails over a period of hours or days to enable forecasting functionality. An EOS might also perform a variety of higher-level processing of the counts, e.g., generating statistics, differentials to determines rates of change, etc.; any arbitrary mathematical function that might provide useful information for decision making.

According to various implementations of EOSs, any of the count processing, decision making, and even learning can happen in a number of places, beginning with the hardware and/or firmware on the sensor node, on intermediate or peer devices, all the way up to back-end processing in the cloud. Given the available resources on a typical sensor node, decision making and learning will typically be more rudimentary than what might be accomplished in the cloud. For example, decision making and/or learning relating to management of the energy flow on the sensor node might be done locally, while decision making and/or learning relating to the environment in which the node is deployed might be more appropriately done in the cloud, particularly for systems with many nodes.

As will be appreciated with reference to the foregoing description, the range of EOS functionality enabled by the present disclosure is vast and diverse. The following are a few representative and non-limiting examples.

The tracking of energy for a device such as a sensor node (e.g., by counting charge transfer events) enables measurement of available energy (e.g., harvested or stored) and measurement of energy consumed to support decision making about the flow of energy in the device. It also supports predictions as to how long it will take for an energy source or a local energy store to be depleted or fully charged.

Tracked energy and predictions about tracked energy can be used in a variety of ways. For example, such information can be used to determine if the energy being harvested over time is greater or less then the energy being consumed by loads. Energy provided by different sources can be tracked to determine relative performance. It can be determined that energy is being harvesting from multiple sources concurrently to support related decision making or functionality. Wake up intervals for a sensor node can be adapted based on available energy. This may be done on the sensor node or on a remote device which can use this information to schedule wake up requests more appropriately. Performance can be increased when time to empty is high or time to full is low.

Histograms may be generated representing things like surplus or deficit energy over one or more periods of time to support longer-term decision making, e.g., in recent time periods more energy has been consumed than produced, so more global power saving functionality can be triggered. Such information can also support more specific decision making, e.g., energy from one harvesting source is decreasing, so another harvesting source might become a higher priority source. Histogram bins can be any arbitrary width depending on the application. Moreover, the horizontal axis for a histogram may not be time, but may instead represent other parameters such as, for example, environmental conditions (e.g., temperature, pressure), range to a gateway or control node (e.g., how much power it takes to connect), etc.

Histogram data can be used to predict when poor harvesting conditions or energy deficits are likely to occur. Such information might be useful, for example, in adapting operating power modes of devices as a function of predicted harvesting. Histogram data for a group of devices (e.g., sensor nodes deployed in a facility) can be processed to understand harvesting and/or energy consumption as a function of time and space. Histogram data can be used as a diagnostic tool to evaluate inconsistencies and find failures. These insights can be leveraged in the design of new operating modes in future revisions. Histogram data can be used to build models of the environment and application needs, and the two can be combined to optimize system operation or the operation of individual devices (e.g., sensor or control nodes) in specific applications and environments. Such optimizations can improve system and/or device reliability, as well as the confidence levels associated with, for example, detection of certain classes of events.

Such models might be used to design and manage redundancy in a system. For example, multiple sensor nodes might be used to monitor the same or similar locations in an environment with the resulting histogram data informing which sensor nodes to activate and when, to manage the energy on individual sensor nodes, and/or the conditions in which the sensors nodes reside.

Energy tracking data may be used to support decision making and functionality in conjunction with other information, e.g., the voltage on a storage capacitor, environmental conditions (e.g., as reflected by onboard sensors), sensor position, harvesting conditions (e.g., as reflected by harvester outputs). Such information may be used to predict the required number of sensors nodes in a given area for sufficient redundancy, and to manage the alternate use of redundant nodes. It might also be used to decide when to combine node samples and which node samples to combine, e.g., if the positions of nodes are correlated, their samples may be combined using predictive models to get improved data.

Information relating to tracked energy may be used to manage load power and performance, e.g., throttling performance up and down based on expected available power. For example, determining that the energy provided by one or more of the energy sources is increasing or decreasing can support decisions to turn more power-hungry loads on or have them enter power-saving modes of operation. Performance parameters can be modified and resulting changes in counts can be used to support decision making. System configurations (e.g., operating voltage and frequency) can be adapted when power consumption is higher than expected or desired.

Energy can be measured for specific operations (e.g., processing of sensor data, transmitting, etc.) supporting, for example, diagnosis of unexpected power consumption in a sensor node. Such an approach can be useful for diagnosing problems with peripherals (e.g., transmitter 210 of FIG. 2) in that the operation of peripherals are often more opaque to local controllers. In conjunction with performing a particular type of operation, particular counts (e.g., for one or more of the energy rails) can be initiated for the duration of the operation to determine the energy consumption required by that operation. This can be used to provide insights on the energy consumption associated with different types of operations, supporting things like the scheduling of operations based on available energy.

Energy can be measured for specific operations to quantify energy per operation as a function of temperature, time, space. As discussed above, tracking of charge transfer events as described herein may allow for more accurate representations of energy provided and energy consumed. Tracking when an energy storage capacitor is used as storage and when it is used as a power source can be used to improve device firmware and hardware.

A particular implementation of a power management unit (PMU) that may be employed with implementations enabled by the present disclosure will now be described with reference to FIGS. 4, 5, and 6. The primary functionality of PMU 400 is to harvest energy efficiently from the multiple energy sources (represented in this example by $V_{TEG}$ and $V_{PV}$), store the harvested energy (e.g., in a capacitor), and convert the harvested energy into regulated energy rails (represented in this example as four output rails: 1.8V, 1.2V, 0.9V, and an adjustable rail from 0.5V~0.8V.

The PMU architecture depicted in FIG. 4 includes only a single stage of DC-DC conversion and therefore includes only one inductor 402 for both energy harvesting and output rail regulation. This represents higher end-to-end efficiency (e.g., from harvesting source to rail(s)) than multi-stage designs, allows for multi-channel harvesting. This multiple input, single inductor, multiple output (MISIMO) design allows for harvested energy to be transferred directly from any of the input energy sources to any of the energy rails in a single switching cycle. A local storage capacitor (VCAP) can be used as both an energy reservoir for storing input energy, as well as an input energy source to deliver charge to any of the output rails when charge is requested.

The MISIMO PMU operates as an asynchronous state machine. Each output rail has a set of two comparators (not shown). When the output rail droops below its configurable setpoint (e.g., the rail droops due to its load), a request comparator sends a request to the controller (e.g., implemented as part of controller 208 of FIG. 2) for more current. If the rail droops >10% below its setpoint (e.g., if the rail is overloaded), the rail-ready comparator de-asserts.

When a rail requests current, the controller checks if there is energy available from one of the input energy sources, e.g., in this example, a TEG and a photovoltaic (PV) cell represented by $V_{TEG}$ and $V_{PV}$. If there is energy available from any of the energy sources, the energy is transferred directly from the source to the output rail by activating the corresponding pair of switches of the depicted switch matrix that connect the sources and the rails to the single-stage regulator. Control of the switch matrix is achieved using inputs SW_TEG, SW_PV, SW_VCAP, SW_1p8, SW_1p2, SW_0p9, and SW_ADJ. If none of the energy sources have sufficient energy available, then VCAP is selected as the source, and charge is transferred from VCAP to the output rail until the rail reaches regulation.

According to a particular implementation, the controller can configure PMU 400 to operate in a high current mode in which energy harvesting is disabled and only VCAP is used as an energy source. This mode is intended to support high load events such as, for example, RF transmissions (e.g., using transmitter 210 of FIG. 2). Because the energy delivered by harvesting sources can vary, blocking these inputs during high load events creates a dedicated channel from VCAP to the corresponding energy rail(s) and ensures that the rail(s) stay in regulation.

According to a particular implementation, energy received from the input energy sources (e.g., harvested energy) is stored on VCAP and a super-capacitor (SCAP). VCAP acts as the primary energy storage and improves startup time. In the depicted implementation, the value of VCAP is about 700 uF with a maximum voltage of about 2.5V. SCAP acts as a backup to extend the lifetime of the device. In the depicted implementation, the value of SCAP is about 470 mF with a maximum voltage of about 2.5V. Load switch 404 is used to transfer charge onto SCAP once VCAP is fully charged. If the depicted implementation had only SCAP, it might take too long for the device to start up if the energy to be harvested is low, e.g., low to moderate light levels. On the other hand, if the depicted implementation had only VCAP, then the device might not be able to operate for more than a few minutes if the harvested energy drops below a certain level. In addition, it may be advantageous for some implementations if the capacitance of VCAP is large enough to support the energy of an RF transmission, but small enough to allow the device to start up in less than a few minutes. Implementations are also contemplated that employ more than two capacitors. More generally, N-stages of energy storage of varying capacity may be provided. By managing the charging patterns of these stages, suitable trade-offs may be achieved between latency associated with certain operations and overall storage capacity According to a specific implementation, logic 406 is implemented such that load switch 404 is off unless the adjustable output rail is up and VCAP>VREG−500 mV, where VREG is the regulation point of VCAP; in this example 2.5V). The POR signal ensures that the load switch is disabled during initial power up, which allows the system to start up more quickly. Comparator 408 references VCAP to the bandgap voltage Vbg to ensure that load switch 404 does not pull VCAP more than 500 mV below its regulation point. If during charging of SCAP VCAP droops to 2V, load switch 404 is turned off to allow VCAP to recover. Using this architecture, SCAP is trickle charged (e.g., charge is transferred from VCAP to SCAP in short bursts) at a rate that is determined by the available energy of the source. Once SCAP exceeds VCAP−500 mV, SCAP is shorted to VCAP and both are charged to the regulation point. According to some implementations, the body diode of switch 404 may allow charge to flow from SCAP to VCAP when there is a load on VCAP. If VCAP is quickly discharged to more than 500 mV below the regulation point, charge can still flow to VCAP (even with load switch 404 disabled) to keep the system alive.

According to some implementations, a PMU is implemented such that a cold start is achieved using only a harvesting energy source, i.e., without a battery. Cold start circuitry brings the PMU part of the way up and then transitions control back to the controller. A particular implementation of cold start circuitry will now be described with reference to the schematic diagram of FIG. 5 and the timing diagram of FIG. 6. As will be discussed, the depicted implementation ramps up VCAP and the highest rail (e.g., the 1.8V rail) at the same time. It should be noted that the specific details of the implementation described with reference to FIGS. 5 and 6 are provided as one example of how to achieve a cold start using a harvesting energy source. A wide range of variations on the depicted themes are within the scope of this disclosure.

Prior to startup, the outputs of the harvesting sources, $V_T$G and $V_P$v, are at zero volts. Startup is initiated with the application of a voltage to either of these input energy channels (t0). Once an adequate voltage has been applied to the selected input channel (t1), the PMU enters cold start. Once VCAP reaches 850 mV (t2), the PMU exits cold start and begins switching in normal mode. In the depicted implementation, VCAP and the highest rail (VREG_1p8) ramp up at the same time. The highest rail is used as a driver for the controller. VREG_1p8 settles at 1.8V (t3) while VCAP continues to ramp up.

Once VCAP hits 2.5V (t4) the other rails (VREG_1p2 and VREG_ADJ are shown) are enabled and ramp up to their respective voltages, 1.2V, 0.9, and an adjustable voltage between 0.5V and 0.8V. Once these rails are ramped up, PWR_READY is asserted, the SCAP load switch is enabled, and charging of SCAP begins (t5). As shown, this causes VCAP to droop to about 2V while SCAP is slowly charged. The ramp rate for SCAP is dependent on available energy. When SCAP reaches 2V (t6), SCAP is shorted to VCAP and both eventually end up at 2.5V (t7). In FIG. 6, the SCAP ramp rate is exaggerated for explanatory purposes.

Figure 5:
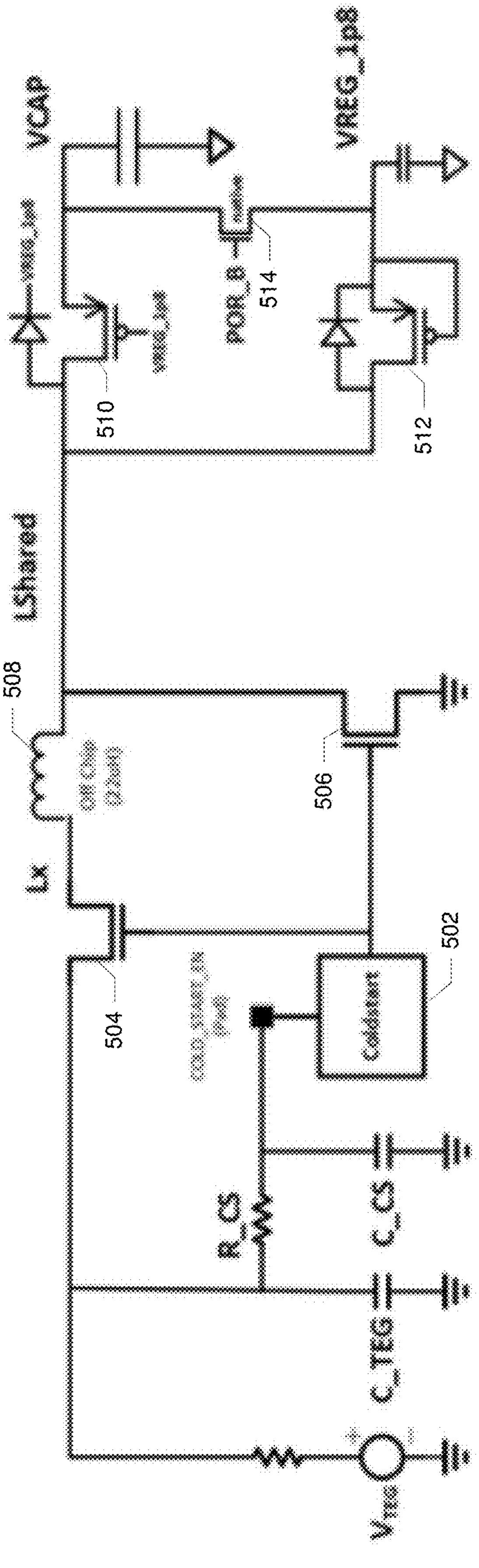
FIG. 5 is a schematic diagram of cold start circuitry for use with some implementations enabled by the present disclosure.
Figure 6:
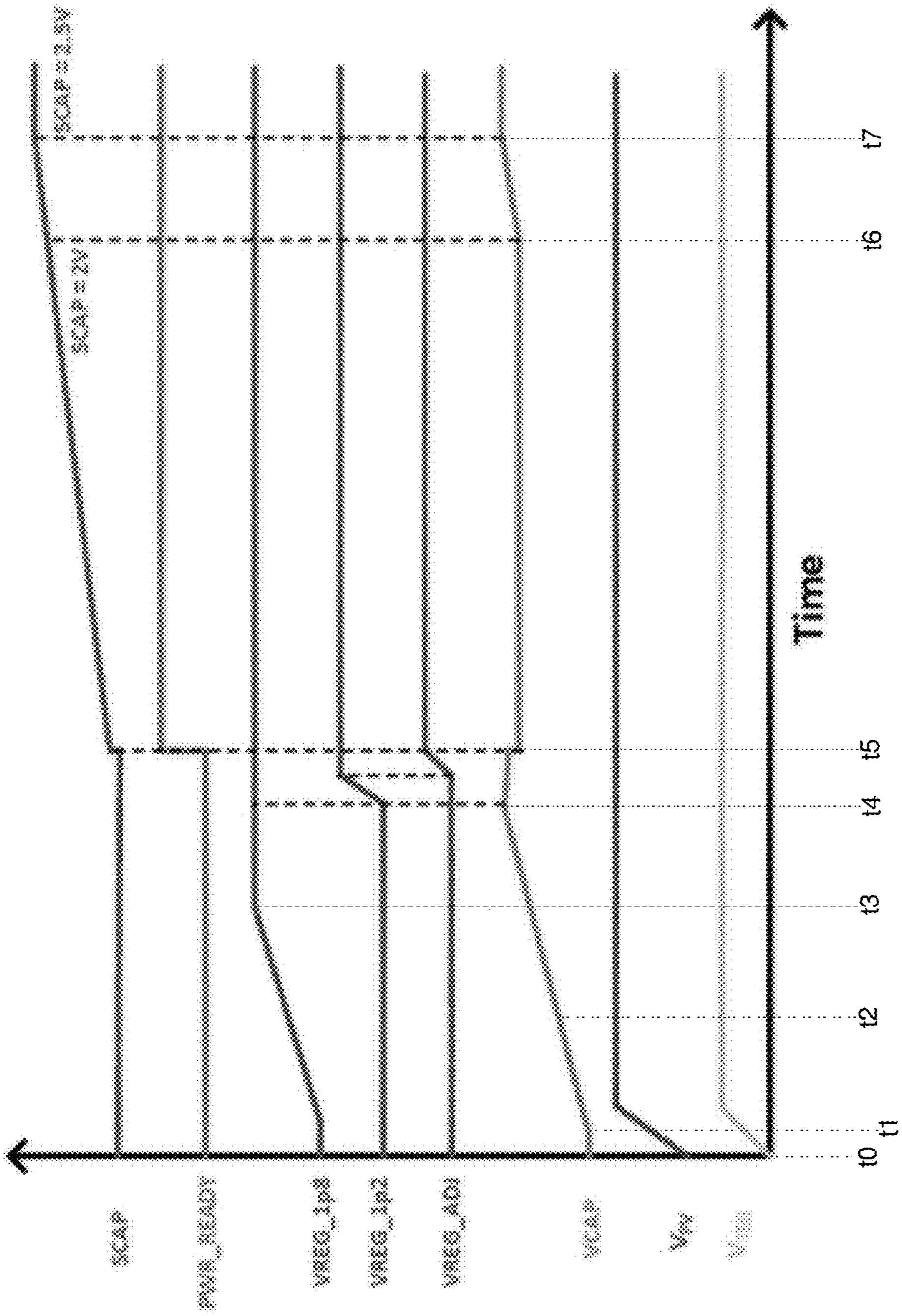
FIG. 6 is a timing diagram illustration a startup sequence used with some implementations enabled by the present disclosure.

As shown in FIG. 5, the input harvesting channel $V_{TEG}$ has cold start circuitry 502 that allows the PMU to start up as described herein. It should be noted, however, that implementations are contemplated in which cold start may be initiated from either channel, or both channels simultaneously. The cold start circuits run directly off a harvesting channel because, initially, this is the only available power supply. According to a particular implementation, cold start circuitry 502 employs a ring oscillator to drive a charge pump (not shown) which generate pulses on FETs 504 and 506 to charge PMU inductor 508. Once inductor 508 is sufficiently charged, FET 506 is turned off, and current flows through p-channel FETs 510 and 512 to transfer charge to VCAP and the 1.8V rail. Cold start circuitry 502 is active when VCAP<850 mV and, depending on which input channel is used, $V_{TEG}$>225 mV or $I_{PV}$>20 uA. According to a particular implementation in which the $V_{TEG}$ channel is configured to initiate a cold start of the PMU, switches 510 and 512 are in parallel with the switches in the PMU switch matrix associated with VCAP and the highest rail.

According to a particular implementation, a switch 514 may be provided that temporarily shorts VCAP and highest rail together so they ramp up together until they hit the rails regulated voltage (e.g., 1.8V), at which point they are disconnected. This may be advantageous in that the capacitance of VCAP is typically larger than that of the highest rail. As such, VCAP would otherwise charge more slowly than rail. Shorting them together causes them to ramp up together.

The PMU switching circuitry for implementations that employ a battery may be relatively straightforward due to the fact that the battery is typically and reliably the highest voltage in the system. By contrast, in the PMU of FIG. 4, VCAP is variable (e.g., anywhere between 0V and 2.5V) and so proper operation of the PMU switch matrix needs to account for any level in VCAP's range. According to a particular implementation, switch select logic 410 is provided for VCAP and the highest rail in which PMOS switches 412 and 414 are controlled according to which of the two voltages is higher. More specifically, the body diodes of these two p-channel devices are driven to the higher of the two voltages to ensure that the body diodes aren't forward biased. Similarly, the gates of these devices may also be driven to the higher of the two voltages. Switch select logic 410 senses the two voltages and each time they switch, the higher one (Max(VCAP,VREG_1.8)) is used to drive the gates and the body diodes of the p-channel devices. While this introduces some complexity, it enables battery-less operation.

As discussed above, implementations are enabled by the present disclosure in which each current pulse from a source to a rail represents substantially the same amount of energy. This uniformity allows for an accurate understanding of each charge transfer event, enabling at least some of the Energy OS functionality described herein. According to a particular class of implementations, a current controller is provided as part of the PMU (e.g., controller 420 of PMU 400 of FIG. 4) that controls the switches of the PMU switch matrix, connecting the various sources and rails to the PMU's inductor in a manner that ensures that substantially the same amount of charge is transferred for each event.

When charge is requested for one of the rails, the time that the selected source is connected to the inductor is varied based on the voltage of that source. For a higher voltage, the current in the inductor ramps more quickly, so the connection time will be shorter. When the source voltage is low, the time the source is connected to the inductor will be longer for the same amount of charge. In a particular implementation, VCAP can vary quite a bit, e.g., from 0.85-2.5 volts, while the TEG voltage might go as low as 50 mV. The source connection time is varied accordingly to result in substantially the same amount of charge being transferred despite the considerable variation in source voltage.

According to a particular implementation, a current controller employs voltage-to-current conversion to control the switches that connect the sources and the rails to the inductor for each charge transfer cycle. During the ramp-up phase of the charge transfer cycle, the controller enables the switch associated with the selected source (e.g., via signals SW_TEG, SW_PV, and SW_VCAP) and the current ramps up in the inductor for an amount of time that is dependent on the voltage of that source (e.g., $V_{TEG}$, $V_{PV}$, VCAP). The ramp-down phase of the charge transfer cycle connects the inductor to the requesting rail (e.g., via signals SW_1p8, SW_1p2, SW_0.9, and SW_ADJ) for an amount of time that is dependent on the voltage across the inductor, e.g., when that voltage reaches zero, it means that there is no current in the inductor, so the rail is then disconnected.

During the ramp-up phase, the peak current controller generates a current that is proportional to input voltage. The current is transferred onto a digitally tune-able capacitor bank which allows the inductor peak current to be configured by firmware. The voltage of the capacitor is compared to a reference using a comparator (not shown). When the voltage on the capacitor reaches that reference, the switch connecting the source to the inductor is turned off. As will be appreciated, this results in substantially the same amount of charge being stored each time a source is connected to the inductor despite the range of variation of the voltages of the various sources. The switch connecting the requesting rail to the inductor is enabled and the stored charge is transferred to the connected rail until the voltage across the inductor goes to zero, indicating that all of the charge in the capacitor has been transferred.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A device, comprising:
- one or more energy inputs configured to receive harvested energy from one or more energy sources;
- one or more energy rails configured to provide controlled energy to one or more components;
- switching circuitry configured to selectively connect the one or more energy inputs and the one or more energy rails, the switching circuitry configured to provide a first portion of the harvested energy to an energy store, and to provide a second portion of the harvested energy to the one or more energy rails;
- logic configured to track amounts of the harvested energy and amounts of the controlled energy, including sensing a signal level associated with the energy store, and to control operation of the device based on the signal level; and
- cold-start circuitry configured to start operation of the device based on a status of the energy store.

2. The device of claim 1, further comprising a transmitter configured to transmit energy data derived from the amounts of the harvested energy.

3. The device of claim 2, wherein the one or more components includes a receiver configured to receive remotely-generated control data that is responsive to the energy data, the control data being configured to control operation of the device.

4. The device of claim 1, wherein the logic is further configured to determine a rate of change of the harvested energy.

5. The device of claim 1, wherein the logic is configured to control operation of the device by controlling operation of the switching circuitry.

6. The device of claim 1, wherein the logic is configured to control operation of the device by selecting an operational mode of the device.

7. The device of claim 1, wherein the logic is configured to track the amounts of the harvested energy in connection with an operation performed by the device.

8. The device of claim 1, wherein the logic is configured to control battery-less operation of the device based on the amounts of the harvested energy.

9. A method, comprising:
- providing a first portion of harvested energy to an energy store and a second portion of the harvested energy to one or more energy rails configured to provide controlled energy to one or more components;
- tracking amounts of the harvested energy received from one or more energy sources and amounts of the controlled energy;
- controlling operation of a wireless sensor node based on at least the amounts of the harvested energy; and
- providing cold-start operation of the wireless sensor node based on a status of the energy store.

10. The method of claim 9, further comprising transmitting energy data representing the amounts of the harvested energy to a remote device.

11. The method of claim 9, further comprising receiving energy data representing the amounts of the harvested energy.

12. The method of claim 9, wherein the wireless sensor node is one of a plurality of wireless sensor nodes operating in an environment, the method further comprising controlling one or more network characteristics relating to one or more of the wireless sensor nodes based on the amounts of the harvested energy.

13. The method of claim 9, wherein the wireless sensor node is one of a plurality of wireless sensor nodes operating in an environment, the method further comprising generating a model of the environment based on the amounts of the harvested energy.

14. The method of claim 9, further comprising determining a rate of change of the harvested energy.

15. The method of claim 9, further comprising tracking the amounts of the harvested energy over multiple time periods.

16. The method of claim 9, wherein controlling operation of the wireless sensor node includes controlling operation of switching circuitry configured to selectively connect the one or more energy sources.

17. The method of claim 9, wherein controlling operation of the wireless sensor node includes selecting an operational mode of the wireless sensor node.

18. The method of claim 9, wherein operation of the wireless sensor node is battery-less operation.

19. A system, comprising logic configured to:
- provide a first portion of harvested energy to an energy store associated with a device and a second portion of the harvested energy to one or more energy rails configured to provide controlled energy to one or more components;
- track amounts of the harvested energy received from one or more energy sources and amounts of the controlled energy;
- control operation of the device based on at least the amounts of the harvested energy; and
- provide cold-start operation of the device based on a status of the energy store.

20. The system of claim 19, wherein the logic is further configured to predict energy availability based on the amounts of the harvested energy.

* * * * *